United States Patent [19]

Hicks, Jr.

[11] Patent Number: 4,827,346

[45] Date of Patent: May 2, 1989

[54] ELECTRONIC CAMERA TUBE UTILIZING AN ARRAY OF CHARGE STORAGE CELLS FOR IMAGE STORAGE AND TUNNELING DEVICES FOR READOUT

[75] Inventor: John W. Hicks, Jr., Northboro, Mass.

[73] Assignee: Peter D. Sahagen, New York, N.Y.

[21] Appl. No.: 96,623

[22] Filed: Sep. 14, 1987

[51] Int. Cl.[4] .............................................. H04N 5/228

[52] U.S. Cl. ................................ 358/217; 358/213.11; 358/110; 250/213 VT

[58] Field of Search ........... 358/227, 211, 110, 213.11; 250/213 VT

[56] References Cited

U.S. PATENT DOCUMENTS

| | | | |
|---|---|---|---|
| 3,353,114 | 11/1967 | Hanks et al. | 331/94.5 |
| 4,471,378 | 9/1984 | Ng | 358/217 |
| 4,727,427 | 2/1988 | Kime | 358/217 |

*Primary Examiner*—Jin F. Ng
*Assistant Examiner*—Stephen Brinich
*Attorney, Agent, or Firm*—Wolf, Greenfield & Sacks

[57] ABSTRACT

An electronic camera tube includes a transparent envelope enclosing an evacuated cavity, a photocathode layer on a first internal surface of the envelope and an array of cells on a second internal surface of the envelope. The first and second surfaces are parallel and closely spaced. The photocathode layer emits electrons in response to an incident light intensity pattern. The cells in the array receive the electrons from the photocathode layer and emit secondary electrons, thereby accumulating a charge pattern representing the light intensity pattern. The camera tube further includes readout devices for reading out the charge pattern during a readout phase. The readout devices operate by electron tunneling and inject electrons perpendicular to the cell array through the evacuated cavity to readout electrodes on the photocathode layer. The electron currents injected through the evacuated cavity by the readout devices are controlled in response to the charge on the respective cells in the array.

37 Claims, 4 Drawing Sheets

FIG. 5
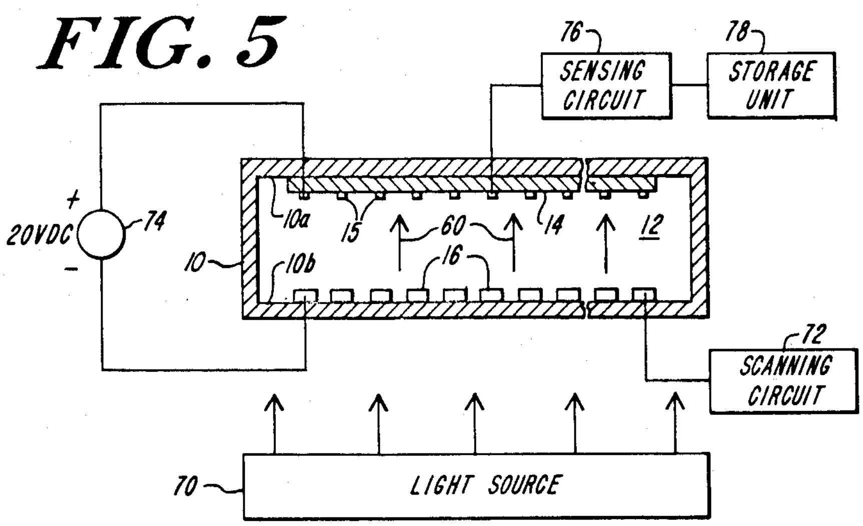
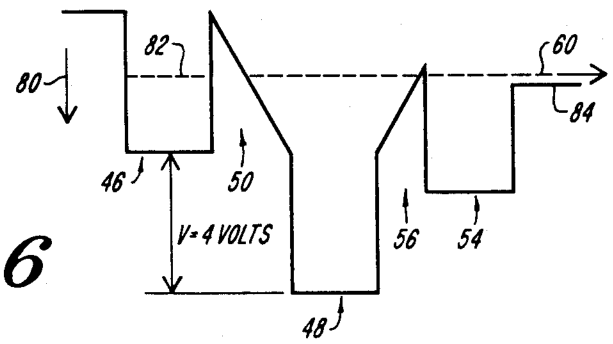
FIG. 6
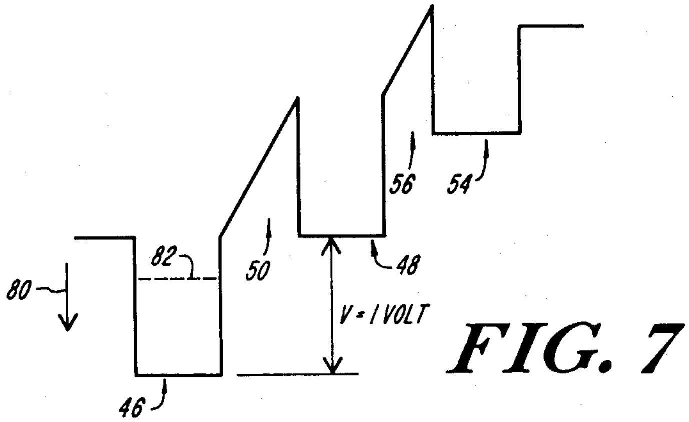
FIG. 7

ELECTRONIC CAMERA TUBE UTILIZING AN ARRAY OF CHARGE STORAGE CELLS FOR IMAGE STORAGE AND TUNNELING DEVICES FOR READOUT

FIELD OF THE INVENTION

This invention relates to an electronic camera tube primarily for use in still photography and also for use in high resolution movie photography and, more particularly, to a camera tube utilizing temporary storage in an array of cells of a charge pattern representing a light intensity pattern and subsequent readout of the charge pattern perpendicular to the cell array. The invention also relates to novel devices for charge storage and readout. The devices are useful in implementing the electronic camera tube, but are not limited to such use.

BACKGROUND OF THE INVENTION

It has been an object of recent research to provide an electronic camera which is practical for the consumer market. Such a camera must be relatively low in cost and small in size and must have an acceptable level of sensitivity and resolution. In addition, the electronic camera must store the image for readout either immediately or at a later time. Such a camera eliminates the inconvenience and expense of conventional film.

Most prior art electronic cameras have been designed for television or video use. Such cameras have resolutions of about 500 pixels across a frame which is below the resolution people expect in a still photograph. In addition, these cameras are extremely noisy. When this noise is averaged over several frames, as is the case with movie photography, it is acceptable. However, the noise level is unacceptable for a single frame. Recent electronic still cameras have low resolution, high price, or both.

It is an object of the present invention to provide a novel electronic camera tube.

It is another object of the present invention to provide a electronic camera tube utilizing an array of cells for storing a charge pattern representative of a light intensity pattern and a device associated with each of the cells for reading out the charge pattern.

It is another object of the present invention to provide a camera tube including an array of cells for storing a charge pattern representative of a light intensity pattern, each of the cells relying upon the generation and displacement of secondary electrons for accumulating an electrical charge.

It is still another object of the present invention to provide an electronic camera tube including an array of cells for storing a charge pattern representative of a light intensity pattern wherein the charge pattern is read out perpendicular to the cell array.

It is a further object of the present invention to provide an electronic camera tube including an array of cells for storing a charge pattern representative of a light intensity pattern and a tunneling device associated with each of the cells for injecting readout electrons representative of the cell charge through an evacuated cavity to a readout electrode.

It is yet another object of the present invention to provide an electronic camera tube having high sensitivity and high operating speed.

It is still another object of the present invention to provide an electronic camera tube which is relatively small in size.

It is a further object of the present invention to provied a tunneling device wherein the voltage applied to a control electrode controls injection of electrons into an evaculated cavity.

SUMMARY OF THE INVENTION

According to the present invention, these and other objects and advantages are achieved in a camera tube comprising a transparent or image transmissive envelope enclosing an evacuated cavity, the envelope having within it first and second parallel, closely-spaced internal surfaces, a photocathode layer disposed on the first internal surface and capable of emitting electrons having a spatial variation representative of an incident light intensity pattern when exposed to light in a predetermined wavelength range, an array of cells disposed on the second internal surface, each of the cells emitting secondary electrons and thereby accumulating a charge in response to electrons emitted by a portion of the photocathode layer opposite that cell during exposure to the light intensity pattern, first means for biasing the photocathode layer at a negative potential relative to the array of cells during exposure and means for sensing the charge on each of the cells in the array during a readout phase after exposure to provide an electronic representation of the incident light intensity pattern.

Preferably, the sensing means includes a tunneling device associated with each of the cells including a first conductive layer, a first insulating layer which overlies the first conductive layer, a second conductive layer which overlies the first insulating layer, a second insulating layer which overlies the second conductive layer and a third overlies the second insulating layer and is coupled to the associated cell, means for addressing the tunneling device associated with each of the cells for readout, means for injecting readout electrons from the first conductive layer through the first insulating layer into the second conductive layer such that the readout electrons tunnel through the second insulating layer and are injected through the third conductive layer into the evacuated cavity, the number of electrons injected into the evacuated cavity being controlled by the charge on the cell coupled to the third conductive layer, and electrode means for receiving the readout electrons injected into the evacuated cavity. The electrode means for receiving readout electrons can comprise the photocathode layer and means for biasing the photocathode layer at a positive potential relative to the addressed tunnel device during the readout phase. Preferably, the electrode means for receiving readout electrons comprises a plurality of conductive strips disposed in the evacuated cavity on the first internal surface in alignment with the array of cells.

Preferably, each of the cells in the array comprises a thin metal upper electrode layer separated from a secondary electron collector electrode by at least one insulating layer, and the secondary electron collector is coupled to a bias voltage means. The addressing means includes means for biasing each nonaddressed tunnel device so that the second conductive layer is at a negative potential relative to the first conductive layer and means for biasing each addressed tunnel device so that the second conductive layer is at a positive potential relative to the first conductive layer. The tunnel devices can be addressed one at a time. Alternatively, one row or column of devices can be addressed simultaneously.

According to another aspect of the invention, there is provided a camera tube comprising an envelope defining an evacuated cavity, an array of selectively addressable cells in the evacuated cavity, each capable of temporarily storing an electrical charge, means for causing a charge pattern representative of a light intensity pattern to be formed on the array of cells during an exposure phase, and means for sensing the charge on each of the cells in the array during a readout phase after exposure by stimulating and sensing a readout signal generally perpendicular to the array of cells through the evacuated cavity to provide an electronic representation of the light intensity pattern.

According to yet another aspect of the invention, there is provided a charge pattern storage and readout device comprising an envelope defining an evacuated cavity, an array of selectively addressable cells in the evacuated cavity each capable of temporarily storing an electrical charge, means for causing a charge pattern to be formed on the array of cells during a storage phase and means for sensing the charge on each of the cells in the array during a readout phase after charging by stimulating and sensing a readout signal generally perpendicular to the array of cells through the evacuated cavity to provide an electronic representation of the charge pattern.

According to still another aspect of the present invention, there is provided a high speed electronic device comprising an envelope defining an evacuated cavity, a tunneling device in the evacuated cavity and including a first conductive layer, a first insulating layer which overlies the first conductive layer, a second conductive layer which overlies the first insulating layer, a second insulating layer which overlies the second conductive layer and a third conductive layer which overlies the second insulating layer, means for applying a control voltage to the third conductive layer, means for biasing the second conductive layer at a positive potential relative to the first conductive layer during operation, and electrode means for receiving the electrons passing into the evacuated cavity. Photoelectrons generated by a light source that illuminates the first conductive layer or thermal electrons in the first conductive layer tunnel through the first insulating layer into the second conductive layer. The electrons in the first conductive layer have a probability that is controlled by the control voltage of tunneling through the second insulating layer and passing through the third conductive layer into the evacuated cavity where they are collected by the electrode means. An output signal can be taken from the electrode means or the second conductive layer, or both.

BRIEF DESCRIPTION OF THE DRAWINGS

For a better understanding of the present invention together with other and further objects, advantages and capabilities thereof, reference is made to the accompanying drawings which are incorporated herein by reference and in which:

FIG. 5 is a block diagram of the camera tube readout operation wherein photoelectrons are used for readout;

FIG. 6 is an energy diagram of an addressed tunnel device which uses photoelectrons for readout and which has a lowered work function on the outer surface of the third electrode;

FIG. 7 is an energy diagram of a tunnel device which is not addressed;

DETAILED DESCRIPTION OF THE INVENTION

Figure 1:
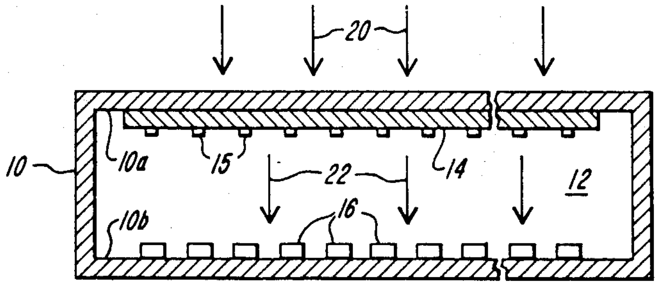
FIG. 1 is an enlarged cross-sectional view of a camera tube in accordance with the present invention.

An electronic camera tube in accordance with the present invention is shown in simplified form in FIG. 1. A transparent envelope 10 encloses an evacuated cavity 12 having a pressure such that the mean free path of electrons is much longer than the path between the two surfaces 10*a* and 10*b*. The envelope 10 includes internal surfaces 10*a*, 10*b* which are substantially parallel to each other and which are spaced apart by a distance on the order of 10 to 100 micrometers. A photocathode layer 14, such as a type S-20 or a multi-alkali photocathode material, is adhered to the internal surface 10*a* of envelope 10. When the photocathode layer 14 is exposed to light in a predetermined wavelength range, it emits electrons having a spatial variation representative of the incident light intensity pattern. Located on the opposite internal surface 10*b* is an array of cells 16. Preferably, the array of cells 16 is arranged in a matrix of rows and columns. Electrical connections are made through envelope 10 to the photocathode layer 14 and to the array of cells 16 by conventional vacuum feedthroughs.

A plurality of readout electrodes 15 is located on the inside surface of the photocathode layer 14. Preferably, the readout electrodes 15 are conductive strips parallel to either the rows or the columns of the cell array and equal in number to either the rows or the columns of cells. Thus, one conductive strip parallels each row or each column of the cell array.

In basic operation, a light intensity pattern 20 is directed by a suitable lens system (not shown) through transparent envelope 10 to photocathode layer 14, causing emission of electrons 22 therefrom. The electrons 22 are accelerated by an applied bias voltage of about 1000 volts across the evacuated cavity 12 to the array of cells 16. The electrons 22 cause a charge pattern representative of the light intensity pattern 20 to be formed and stored on the cells 16. The charge pattern is read out from the cells 16, as described in detail hereinafter, to provide an electronic representation of the incident light intensity pattern.

Figure 2:
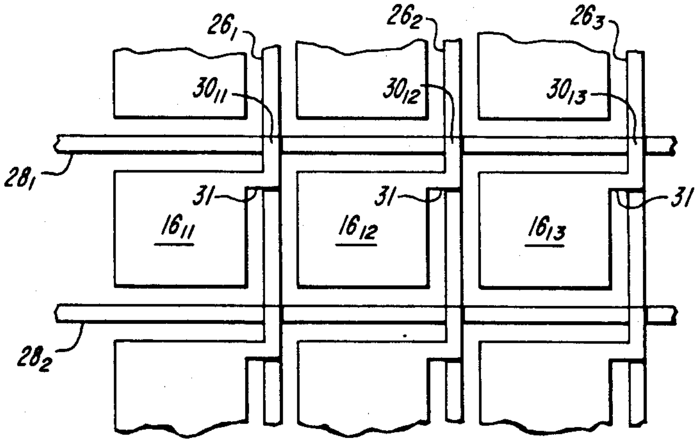
FIG. 2 is an enlarged partial plan view of a cell array for storing a charge pattern.

A partial view of the cell array illustrating cells $16_{11}$, $16_{12}$ and $16_{13}$ is shown in FIG. 2. Column conductors $26_1$, $26_2$, $26_3$ and row conductors $28_1$, $28_2$ are spaced apart to define a grid. Cells $16_{11}$, $16_{12}$, $16_{13}$ are located in the spaces between the conductors 26, 28. At each intersection between the column conductors 26 and the row conductors 28 is a readout device 30. At the intersection of column conductor 261 and row conductor $28_1$ is readout device $30_{11}$; at the intersection of column conductor $26_2$ and row conductor $28_1$ is readout device $30_{12}$; and at the intersection of column conductor $26_3$ and row conductor $28_1$ is readout device $30_{13}$. The cells $16_{11}$, $16_{12}$, $16_{13}$ are connected to readout device $30_{11}$, $30_{12}$, $30_{13}$, respectively, by conductive strips 31. The array containing the above-described structure extends in two dimensions with a desired number of elements. Preferably, the cells 16 have a dimension on the order of 5 micrometers on a side, and conductors 26, 28 are about 0.5 to 1.0 micrometer wide. The array typically contains 5000×5000 elements or pixels. A cell 16, a readout device 30 and the associated row and column conductors 28, 26 comprise a pixel.

Figure 3:
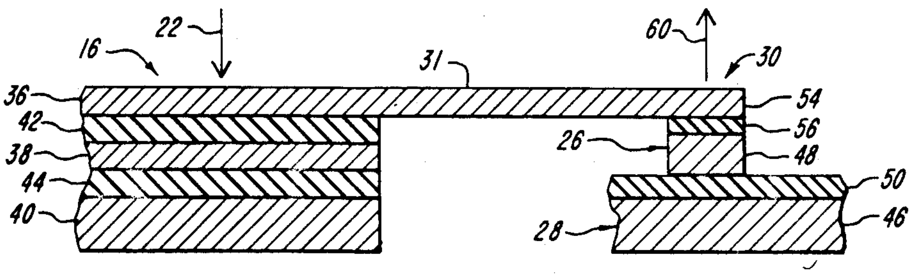
FIG. 3 is an enlarged cross-sectional view of a cell and a readout device.

A cross-sectional view of a preferred cell 16 and readout device 30 is shown in FIG. 3. Cell 16 includes an upper electrode 36, an intermediate electrode 38 and a lower electrode 40. The upper electrode 36 and the intermediate electrode 38 are separated by an insulating layer 42, and the intermediate electrode 38 is separated from the lower electrode 40 by an insulating layer 44. The electrodes 36 and 38 are preferably aluminum layers each having a thickness on the order of 100 angstroms, while the lower electrode 40 is preferably aluminum having a thickness of 1,000 angstroms or more. The insulating layers 42, 44 are preferably aluminum oxide having a thickness in the range of 30–60 angstroms each. Although the example of FIG. 3 includes three electrodes separated by insulating layers, 2 to 20 electrodes can be used, and each pair of electrodes is separated by an insulating layer.

When energetic electrons 22 from photocathode layer 14 impinge on upper electrode 36, thy cause generation of energetic secondary electrons which have a primary velocity component toward insulating layer 42. Some fraction of the secondary electrons are driven through the insulating layer 42 to intermediate electrode 38 where additional secondary electrons are generated. A fraction of those secondary electrons are driven from intermediate electrode 38 through insulating layer 44 to lower electrode 40. As a result of secondary electron displacement, upper electrode 36 becomes positively charged relative to its initial charge. The charge accumulated on upper electrode 36 is representative of the number of incident primary electrons 22 which, in turn, is representative of the light intensity pattern 20 incident upon photocathode layer 14. Thus, the charge pattern stored on the array of cells 16 is representative of the light intensity pattern 20.

The readout device 30 includes a first conductive layer 46 comprising a segment of one of the row conductors 28 and a second conductive layer 48 comprising a segment of one of the column conductors 26. The overlapping areas of conductors 26 and 28 at their intersection determine the area of the readout device 30. The cross-sectional view of readout device 30 shown in FIG. 3 is viewed in the direction of column conductor 26. The first and second layers 46, 48 of the readout device are separated by an insulating first oxide layer 50. The upper electrode 36 of cell 16 is connected by conductive strip 31 to the intersection of conductors 26 and 28 as shown in FIG. 2 to form a third conductive layer 54 of the readout device 30. The third conductive layer 54 is separated from the second conductive layer 48 by an insulating second oxide layer 56. Preferably, the conductive layers 46, 48, 54 of readout device 30 are aluminum each having a thickness on the order of 30 angstroms, and the oxide layers 50, 56 are aluminum oxide each having a thickness on the order of 10 angstroms.

The readout device 30 operates on the tunneling principle, but is different from known tunneling devices. A selected readout device 30 in the array is addressed by application of appropriate bias voltages to the corresponding column conductor 26 and row conductor 28. The required bias voltages are described in detail hereinafter. Energetic photoelectrons are generated in first conductive layer 46 by application of light from an external light source. Alternatively, thermal electrons or free electrons in conductive layer 46 can be utilized as the source of tunneling electrons. The electrons have a probability of tunneling through oxide layer 50 to second conductive layer 48 and then have a probability of tunneling from second conductive layer 48 through oxide layer 56 to third conductive layer 54. The magnitude of the potential barrier between conductive layers 48 and 54, and thereby the probability of electrons tunneling through that barrier, is controlled by the voltage on conductive layer 54. As discussed previously, conductive layer 54 is connected to the upper electrode 36 of a cell in the array and stores a charge representative of the light incident upon a portion of the photocathode layer 14 opposite that cell. By depositing a material of lower work function on the upper surface of conductive layer 54 or by suitable biasing of conductive layers 46, 48, 54, the electrons which tunnel through oxide layer 56 pass directly through conductive layer 54 and are injected into the evacuated cavity 12 as an electron beam 60. The current level of electron beam 60 is representative of the charge previously stored on cell 16 in response to an incident light intensity pattern.

Figure 4:
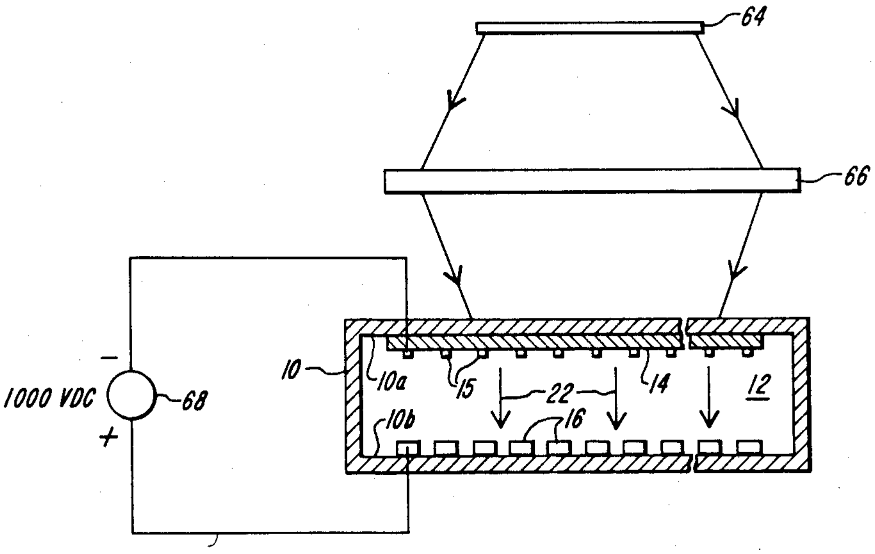
FIG. 4 is a block diagram of the camera tube operation during the exposure phase.

Operation of the camera tube of the present inventio involves an exposure phase as illustrated in FIG. 4 and a readout phase as illustrated in FIG. 5. During the exposure phase, an object 64 or scene to be photographed, is focused by a lens system 66 on the photocathode layer 14 for a prescribed time. The array of cells 16 is biased by a d.c. voltage source 68 at a positive potential of approximately 1,000 volts relative to photocathode layer 14 during the exposure phase. The light intensity pattern received from object 64 causes the photocathode layer 14 to emit electrons 22. The electrons emitted from photocathode layer 14 have a spatial current variation corresponding to the incident light intensity pattern. The electrons 22 are accelerated by voltage source 68 and impinge on cells 16 in the array. As described hereinabove, the energetic electrons 22 cause emission of secondary electrons from the upper electrode 36 of each cell 16, causing the upper electrode 36 to become more positively charged. Each cell 16 becomes charged in proportion to the number of electrons 22 received from a portion of the photocathode layer 14 opposite that cell. A charge pattern is stored on the array of cells 16 which represents the light intensity pattern received from object 64. At the end of the exposure phase, the charge pattern is stored on the array of cells 16.

A readout phase subsequent to the exposure phase transfers the pattern stored on the array of cells 16 to a storage unit for later use so that the camera tube is available for another exposure. As illustrated in FIG. 5, in one embodiment of the invention, light from a light source 70 is directed at the rear surface of the camera tube opposite the side from which the light intensity pattern is received. The light from source 70 impinges on the first conductive layer 46 (FIG. 3) of each readout device 30, causing the production of photoelectrons in the conductive layer 46. A scanning circuit 72 is coupled to the row conductors 28 and to the column conductors 26 for sequentially addressing the readout devices 30 associated with each of the cells in the array. Scanning circuit 72 can address one cell at a time. Alternatively, the scanning circuit 72 can be configured to address the devices in one row or column simultaneously.

A d.c. voltage source 74 is coupled between the readout devices 30 and the readout electrodes 15 during the readout phase for biasing the readout electrodes 15 at a positive potential of about 20 volts relative to the readout devices 30. The addressed readout device, or devices 30, emit electron beams 60 which are accelerated across the evacuated cavity 12 and are collected by the readout electrodes 15. The electrons induce in one of the readout electrodes 15 a current which is provided to a sensing circuit 76.

Sensing circuit 76 typically includes an amplifier, a sample and hold circuit and an analog-to-digital converter for converting the sensed analog value to a digital representation. A digital value for each cell 16 is stored in a storage unit 78 such as a random access memory or a mass storage memory. The storage unit 78 stores values representing the charge pattern on the cells 16, which in turn represent the light intensity pattern from object 64. The stored values can subsequently be used to recreate an image of object 64 on a video display unit or to create a permanent image on film.

When an entire row or column of cells is addressed at once, a parallel sensing scheme or a scanning sensing scheme is utilized. When, for example, the conductors of the readout electrodes 15 are parallel to the column conductors 26, one row of cells at a time is addressed. The electron beam 60 from each readout device 30 in the addressed row is intercepted by the adjacent conductor of the readout electrode 15 to provide a parallel readout by row.

The light source 70 can illuminate the entire array of cells 16 as the readout devices are addressed or it can track the addressing. However, the light source 70 can provide a spot large enough to cover more than the addressed readout device 30. The addressing by scanning circuit 72 determines the scan pattern, rather than light from source 70.

In an alternate scanning technique, a selected row conductor 28 is biased negatively relative to all column conductors 26 so that all the readout devices 30 in the selected row are addressed electrically. Then, the selected row of readout devices 30 is scanned with a light beam from light source 70. Thus, the scanning is accomplished electrically by row and optically by column.

An energy level diagram of an addressed readout device 30 is shown in FIG. 6, and an energy level diagram of a nonaddressed readout device 30 is shown in FIG. 7. For FIGS. 6 and 7, the various layers of the device are indicated with the corresponding reference numerals from FIG. 3. Increasing potential is in the direction of arrow 80. For an addressed readout device 30, the corresponding column conductor 26 (conductive layer 48) is biased positively relative to the corresponding row conductor 28 (conductive layer 46) by about 4 volts, as shown in FIG. 6. Photoelectrons generated by light source 70 have an energy level 82 and have a known probability (depending on the design of readout device 30) of tunneling from conductive layer 46 through oxide layer 50 to conductive layer 48. The voltage on conductive layer 54 is determined by the charge on the corresponding cell 16. Thus, the barrier between conductive layer 48 and conductive layer 54 is determined by the charge on the associated cell 16. The barrier of oxide layer 56 decreases as the voltage on conductive layer 54 becomes more positive. A fraction of the electrons from conductive layer 48, depending on the barrier height, tunnels through the oxide layer 56 and reaches conductive layer 54.

The work function of the surface of conductive layer 54 is reduced by applying a cesium layer to its surface, thereby reducing the surface energy 84 below electron energy 82. Alternatively, about 5 to 10 angstroms of gold is deposited first, followed by a layer of cesium such that there is about one cesium atom for every two gold atoms. As a result, the electrons which tunnel through oxide layer 56 pass through conductive layer 54 and enter evacuated cavity 12 as electron beam 60. The purpose of applying a cesium layer or gold and cesium layers to the surface of conductive layer 54 is to lower the surface work function to avoid trapping of photoelectrons in conductive layer 54. Trapped electrons would drive conductive layer 54 more negative and tend to turn the readout device completely off.

For nonaddressed readout devices 30, as shown in FIG. 7, the row conductors 28 (conductive layers 46) are biased positively relative to the column conductors 26 (conductive layers 48) by about one volt. This bias condition prevents photoelectrons generated in first conductive layer 46 by light source 70 at energy level 82 as well as thermal electrons from tunneling through oxide layer 50 to conductive layer 48. As a result, the supply of electrons for tunneling through oxide layer 56 is cut off. The reverse bias for nonaddressed cells must be sufficiently large to prevent tunneling in half-addressed readout devices located in the same row and column as the addressed device.

Referring again to FIG. 6, the light from light source 70 which illuminates conductive layer 46 preferably has a wavelength such that the photons have about 0.8 to 0.9 of the work function energy of the metal. In the present example, the work function of aluminum is about 4 electron volts, and photons need about 3.2 electron volts. This corresponds to a wavelength of about 0.35 micrometers. The thickness of oxide layer 50 is selected to provide a probability of about 0.1 to 0.01 that a photoelectron will tunnel through to conductive layer 48. When conductive layer 54 is sufficiently positive, the photoelectrons are free electrons when they reach the oxide layer 56 and pass on through conductive layer 54 and are accelerated by voltage source 74 through the evacuated cavity 12 to the readout electrodes 15. When conductive layer 54 is sufficiently negative, the photoelectron has a reduced probability of getting through to conductive layer 54. This probability is reduced as conductive layer 54 becomes more negative. As a result, the potential of conductive layer 54 modulates the number of electrons injected into the evacuated cavity 12.

Thermal electrons can also tunnel from conductive layer 54 in the reverse direction to conductive layer 48, thereby causing conductive layer 54 to be gradually discharged. To prevent such discharge, it is necessary to make the probability of tunneling for low energy electrons quite small. There are approximately $10^{26}$ thermal electrons per second per square centimeter, which can potentially tunnel through to conductive layer 48. The readout of the array of cells 16 can be completed in about 0.01 second. The total capacitance per square centimeter of conductive layer 54 is on the order of $10^{-8}$ farad. In order to hold the voltage of the conductive layer 54 constant to within 0.1 volt during readout, the total charge transfer must be limited to about $10^9$ electrons in 0.01 seconds. The total intersection area of the readout devices is on the order of 0.01 square centimeter. Therefore, the current density must be less than $10^{13}$ electrons per second per square centimeter, and so the probability of thermal electron tunneling from conductive layer 54 to conductive layer 48 must be on the order of 10−. Undesired tunneling of thermal electrons from conductive layer 46 to conductive layer 48 is not as severe a problem since these electrodes have an external applied voltage. However, the unwanted current must be low enough to limit overheating.

The wavelength of the light source 70 is selected to produce photoelectrons during readout of voltage 0.8 to 0.9 of the work function in order to give a tunneling probability of 0.1 to 0.01 for these photoelectrons while having a tunneling probability of less than 10−for thermal electrons.

After completion of a cycle including the exposure and the readout phase, it is necessary to charge all of the cells 16 to a relatively negative potential in preparation for a new exposure cycle. The photocathode layer 14 is flooded with light, and the array of cells 16 is biased at a relatively low positive voltage relative to photocathode layer 14. The resulting electrons from photocathode layer 14 have low energy so as to limit the production of secondary electrons. As a result, all of the cells 16 are driven to a negative potential relative to column conductors 26 and row conductors 28.

The lower electrode 40 of each cell 16 can be connected to conductive layer 48 of the associated readout device 30 in order to establish a bias voltage between upper electrode 36 and conductive layer 48. Alternatively, each lower electrode 40 can be connected to the conductive layer 48 of the readout device 30 in the adjacent row or column. When a pixel is addressed, the row or column conductor 28, 26 of the adjacent nonaddressed row or column can be controlled to thereby control the bias voltage on upper conductor 36. Varying this bias voltage has the effect of varying the brightness of the light pattern stored.

Figure 8:
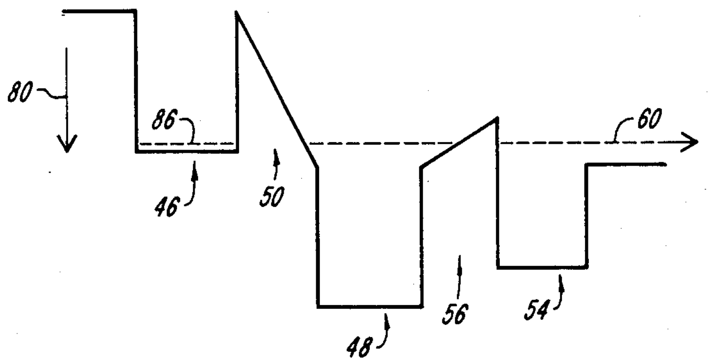
FIG. 8 is an energy diagram of a tunnel device which utilizes thermal electrons for readout and which has a lowered work function on the outer surface of the third electrode.

The energy diagram for an alternative readout method is illustrated in FIG. 8. An addressed readout device 30 is illustrated. Relatively low energy free electrons or thermal electrons are used during readout instead of photoenergized electrons from light source 70. In this embodiment, light source 70 can be eliminated. Free electrons or thermal electrons having a relatively low energy, as indicated at 86, have a probability of tunneling through oxide layer 50 to conductive layer 48. The electron current from conductive layer 46 through oxide layer 50 to conductive 48 is relatively independent of the voltage on conductive layer 54. However, the voltage on conductive layer 54 determines how much of the tunneling current passes through oxide layer 56 and conductive layer 54 into evacuated cavity 12 to readout electrodes 15 and how many electrons remain on conductive layer 48.

Only at the addressed readout device 30 is conductive layer 48 sufficiently positive relative to conductive layer 46 to permit appreciable current flow. For each addressed readout device 30, it is desirable to have $10^2$ to $10^4$ electrons flow for maximum photoexposure. Since the typical readout time internal is 0.01 seconds and the number of cells is on the order of $10^7$, the readout time for a single cell is typically $10^{-9}$ seconds. To provide $10^3$ electrons in $10^{-9}$ seconds requires a current flow of $10^{12}$ electrons per second. Since there are on the order of $10^{26}$ electrons per square centimeter per second reaching the barrier or $10^{18}$ electrons per second for a 1 micron square intersection, the probability of tunneling must be on the order of $10^{-6}$. This tunneling probability is established by adjusting the oxide thickness. For fine adjustment, the bias voltage between the conductive layers 46 and 48 is adjusted.

Figure 9:
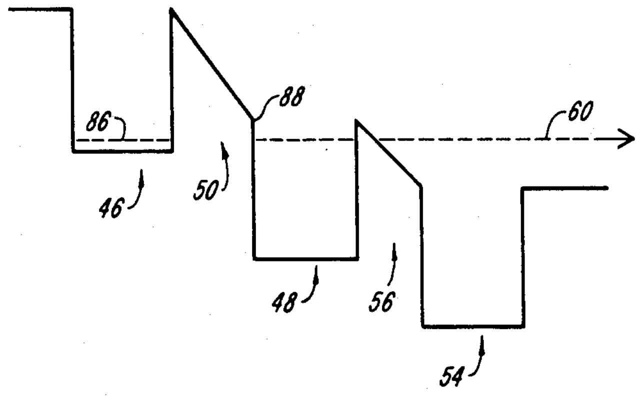
FIG. 9 is an energy diagram of a tunnel device which does not depend on lowering the work function on the outer surface of the third electrode.

The energy diagram for another alternative readout technique is illustrated in FIG. 9. An addressed readout device 30 is illustrated. In this case, free electrons or thermal electrons having a relatively low energy 86 are utilized as described hereinabove. The conductive layer 48 is biased relative to conductive layer 46 such that the energy at point 88 on the surface of conductive layer 48 is slightly above the thermal electron energy 86. With this arrangement, it is not necessary to reduce the work function on the upper surface of conductive layer 54 in order to prevent collection of electrons by conductive layer 54. In this embodiment, conductive layer 48 is biased at a positive potential relative to conductive layer 46 of approximately 3.8 volts when addressed (about 0.2 volt less than the work function).

Figure 10:
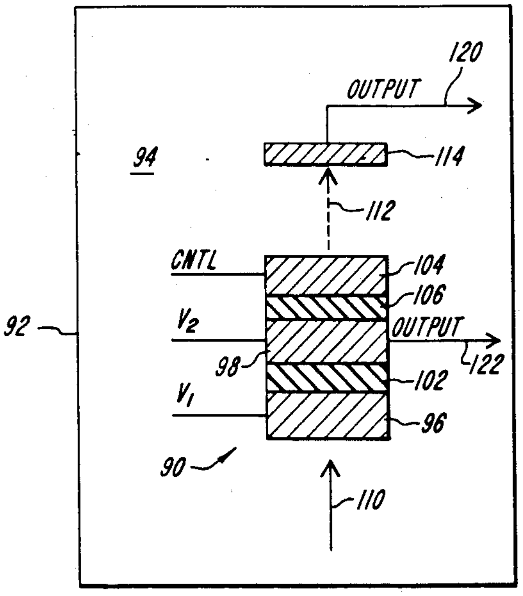
FIG. 10 is a simplified diagrammatic view of a tunnel device in accordance with the present invention.

It will be understood that the readout device 30 based on tunneling principles can have more general applications than the camera tube shown and described herein. A single tunnel device 90 is shown in simplified form in FIG. 10. An envelope 92 encloses an evacuated cavity 94. The tunnel device 90 includes a first conductive layer 96 and a second conductive layer 98 separated by an oxide insulating layer 102. A third conductive layer 104, which serves as a control electrode, is separated from second conductive layer 98 by a second oxide insulating layer 106. The tunnel device 90 can be constructed in the same mannr as described hereinabove in connection with readout device 30. The device 90 is enabled by the application of a positive voltage to conductive layer 98 relative to conductive layer 96, and an input light beam 110 produces photoelectrons in conductive layer 96. The photoelectrons have a probability of tunneling through oxide layers 102 and 106 as described hereinabove in connection with readout device 30. The tunneling current through oxide layer 106 is modulated by the voltage on conductive layer 104. An output electron beam 112 passes through evacuated cavity 94 to an output electrode 114 and produces an output signal 120. The device 90 is biased off by a negative potential on conductive layer 98 relative to conductive layer 96.

The alternative readout techniques described above in connection with readout devices 30 can be applied to the tunnel device 90. Thus, the light beam 110 for readout can be eliminated and the device 90 can be constructed to provide tunneling of thermal electrons from conductive layer 96 through oxide layer 102 to conductive layer 98. The thermal electron current then tunnels through oxide layer 106 to conductive layer 104 as a function of the control voltage applied to conductive layer 104 and passes through conductive layer 104 to become electron beam 112.

For either photoelectron or thermal electron readout, the electrons which do not tunnel through oxide layer 106 remain in conductive layer 98. The electrons in conductive layer 98 can be sensed as an alternative or an additional output signal 122 from the device 90. The output signal 122 is sensed by means of a conductor connected to conductive layer 98 whereas output signal 120 is sensed by means of electron beam 112 and output electrode 114. The output signal 122 is effectively the inverse of output ignal 120 since those electrons which do not tunnel through oxide layer 106 to become electron beam 112 remain in conductive layer 98 and become output signal 122. Thus, when the control voltage on conductive layer 104 causes the potential barrier to be relatively high, few electrons tunnel through oxide layer 106. This causes output signal 120 to be relatively small and output signal 122 to be relatively large. Conversely, when the potential barrier is relatively low, more electrons tunnel through oxide layer 106, thereby causing output signal 120 to be relatively large and output signal 122 to be relatively small.

While there has been shown and described what is at present considered the preferred embodiments of the present invention, it will be obvious to those skilled in the art that various changes and modifications may be made therein without departing from the scope of the invention as defined by the appended claims.

What is claimed is:

1. A camera tube comprising:

a transparent envelope enclosing an evacuated cavity, said envelope having first and second parallel, closely-spaced internal surfaces;

a photocathode layer disposed on the first internal surface and capable of emitting electrons having a spatial variation representative of an incident light intensity pattern when exposed to light in a predetermined wavelength range;

an array of cells disposed on the second internal surface, each of the cells emitting secondary electrons and thereby accumulating a charge in response to electrons emitted from a portion of the photocathode layer opposite that cell during exposure;

first means for biasing the photocathode layer at a negative potential relative to said array of cells during exposure; and means for sensing the charge on each of the cells in said array during a readout phase after exposure to provide an electronic representation of the incident light intensity pattern.

2. A camera tube as defined in claim 1 wherein said sensing means includes a tunneling device associated with each of said cells including a first conductive layer, a first insulating layer which overlies said first conductive layer, a second conductive layer which overlies said first insulating layer, a second insulating layer which overlies said second conductive layer, and a third conductive layer which overlies said second insulating layer and is coupled to the associated cell, means for addressing the tunneling devices associated with each of said cells for readout, means for injecting readout electrons from said first conductive layer through said first insulating layer into said second conductive layer such that the readout electrons tunnel through said second insulating layer and are injected into said evacuated cavity, the number of electrons injected into said evacuated cavity being controlled by the charge on the cell coupled to said third conductive layer, and electrode means for receiving the readout electrons injected into said evacuated cavity.

3. A camera tube as defined in claim 1 wherein each of the cells comprises a layer of aluminum coated with cesium.

4. A camera tube as defined in claim 1 wherein each of the cells comprises a layer of aluminum coated with a layer of gold and a layer of cesium.

5. A camera tube as defined in claim 2 wherein said addressing means includes second means for biasing each nonaddressed tunnel device so that said second conductive layer is at a negative potential relative to said first conductive layer and for biasing each addressed tunnel device so that said second conductive layer is at a positive potential relative to said first conductive layer.

6. A camera tube as defined in claim 5 wherein said cells are arranged in rows and columns and wherein said addressing means includes a row conductor associated with each row of cells and a column conductor associated with each column of cells, said row and column conductors being used for biasing said tunnel devices during the readout phase.

7. A camera tube as defined in claim 6 further including means for collecting the secondary electrons emitted by each of the cells during exposure.

8. A camera tube as defined in claim 2 wherein said electrode means for receiving readout electrons comprises said photocathode layer and third means for biasing the photocathode layer at a positive potential relative to the addressed tunnel device during the readout phase.

9. A camera tube as defined in claim 2 wherein said electrode means includes a plurality of conductive strips disposed in said evacuated cavity in alignment with said array of cells for receiving said readout electrons.

10. A camera tube as defined in claim 2 wherein said means for injecting readout electrons comprises means for directing a light beam at the addressed tunneling device.

11. A camera tube as defined in claim 6 wherein each tunneling device is formed at the intersection of a row conductor and a column conductor.

12. A camera tube as defined in claim 1 wherein each of said cells comprises a thin metal electrode separated from a secondary electron collector electrode by at least one insulating layer, said secondary electron collector electrode being coupled to a bias voltage means.

13. A camera tube as defined in claim 2 wherein each of said cells comprises a thin metal electrode separated from a secondary electron collector electrode by at least one insulating layer, said secondary electron collector electrode being coupled to the second conductive layer of said tunneling device.

14. A camera tube as defined in claim 2 wherein said third conductive layer has a surface with reduced work function relative to said second conductive layer to prevent collection of electrons by said third conductive layer.

15. A camera tube as defined in claim 2 including means for biasing said first and second conductive layers during readout to prevent collection of electrons by said third conductive layer.

16. A camera tube as defined in claim 2 wherein said means for injecting readout electrons includes means for generating photoelectrons in said first conductive layer.

17. A camera tube as defined in claim 2 wherein said means for injecting readout electrons includes means for injecting a predetermined current of thermal electrons from said first conductive layer into said second conductive layer.

18. A camera tube comprising:

an envelope defining an evacuated cavity;

an array of selectively addressable cells in said evacuated cavity, each capable of temporarily storing an electrical charge;

means for causing a charge pattern representative of a light intensity pattern to be formed on said array of cells during an exposure phase; and means for sensing the charge on each of the cells in said array during a readout phase after exposure by stimulating a readout electron beam generally perpendicular to said array of cells and sensing said readout electron beam to provide an electronic representation of the light intensity pattern.

19. A camera tube as defined in claim 18 wherein said sensing means includes a tunneling device associated with each of said cells including a first conductive layer, a first insulating layer which overlies said first conductive layer, a second conductive layer which overlies said first insulating layer, a second insulating layer which overlies said second conductive layer, and a third conductive layer which overlies said second insulating layer and is coupled to the associated cell, means for addressing the tunneling devices associated with each of said cells for readout, means for injecting readout electrons from said first conductive layer through said first insulating layer into said second conductive layer such that the readout electrons tunnel through said second insulating layer and are injected into said evacuated cavity to form said readout electron beam, the number of electrons injected into said evacuated cavity being controlled by the charge on the cell coupled to said third conductive layer, and electrode means for receiving the readout electrons injected into said evacuated cavity.

20. A camera tube as defined in claim 19 wherein said addressing means includes second means for biasing each nonaddressed tunnel device so that said second conductive layer is at a negative potential relative to said first conductive layer and for biasing each addressed tunnel device so that said second conductive layer is at a positive potential reaative to said first conductive layer.

21. A camera tube as defined in claim 20 wherein said cells are arranged in rows and columns and wherein said addressing means includes a row conductor associated with each row of cells and a column conductor associated with each column of cells, said row and column conductors being used for biasing said tunnel devices during the readout phase.

22. A camera tube as defined in claim 18 wherein each of said cells comprises a thin metal electrode separated from a secondary electron collector electrode by at least one insulating layer, said secondary electron collector electrode being coupled to a bias voltage means.

23. A camera tube as defined in claim 19 wherein said third conductive layer has a surface with reduced work function relative to said second conductive layer to prevent collection of electrons by said third conductive layer.

24. A camera tube as defined in claim 19 including means for biasing said first and second conductive layers during readout to prevent collection of electrons by said third conductive layer.

25. A camera tube as defined in claim 19 wherein said means for injecting readout electrons includes means for generating photoelectrons in said first conductive layer.

26. A camera tube as defined in claim 19 wherein said means for injecting readout electros includes means for injecting a predetermined current of thermal electrons from said first conductive layer into said second conductive layer.

27. A camera tube comprising:

a photocathode layer capable of emitting electrons having a spatial variation representative of an incident light intensity pattern when exposed to light in a predetermined wavelength range;

an array of cells each capable of storing an electrical charge;

means for mounting said photocathode layer and said array of cells in closely-spaced, substantially parallel alignment;

means for providing an evacuated cavity between said photocathode layer and said array of cells;

means for causing the electrons emitted by said photocathode layer to impinge on said array of cells so as to form a charge pattern representative of said light intensity pattern; and means for sensing the charge on each of the cells in said array during a readout phase after exposure to provide an sensing means including:

a tunneling device associated with each of said cells including, a first conductive layer, a first insulating layer which overlies said first conductive layer, a second conductive layer which overlies said first insulating layer, a second insulating layer which overlies said second conductive layer, and a third conductive layer which overlies said second insulating layer and is coupled to the associated cell, means for addressing the tunneling devices associated with each of said cells for readout, means for injecting readout electrons from said first conductive layer through said first insulating layer into said second conductive layer such that the readout electrons tunnel through said second insulating layer and are injected into said evacuated cavity, the number of electrons injected into said evacuated cavity being controlled by the charge on the cell coupled to said third conductive layer, and electrode means for receiving the readout electrons injected into said evacuated cavity.

28. A camera tube as defined in claim 27 wherein said sensing means includes readout means associated with each of said cells for providing a readout signal controlled in response to the charge level on the associated cell, means for sequentially addressing the readout means associated with each of said cells, and means for sensing the readout signals from each of said cells to provide an electronic representation of the incident light intensity pattern.

29. A charge pattern storage and readout device comprising:

an envelope defining an evacuated cavity;

an array of selectively addressable cells in said evacuated cavity, each capable of temporarily storing an electrical charge;

means for causing a charge pattern to be formed on said array of cells during a storage phase; and means for sensing the charge on each of the cells in said array during a readout phase after the storage phase by stimulating a readout electron beam generally perpendicular to said array of cells and sensing said readout electron beam to provide an electronic representation of the charge pattern.

30. A charge pattern storage and readout device as defined in claim 29 wherein said sensing means includes a tunnelling device associated with each of said cells including a first conductive layer, a first insulating layer which overlies said first conductive layer, a second conductive layer which overlies said first insulating layer, a second insulating layer which overlies said second conductive layer, and a third conductive layer which overlies said second insulating layer and is coupled to the associated cell, means for addressing the tunneling devices associated with each of said cells for readout, means for injecting readout electrons from said first conductive layer through said first insulating layer into said second conductive layer such that the readout electrons tunnel through said second insulating layer and are injected into said evacuated cavity to form said readout electron beam, the number of electrons injected into said evacuated cavity being controlled by the charge on the cell coupled to said third conductive layer, and electrode means for receiving the readout electrons injected into said evacuated cavity.

31. A high speed electronic device comprising:

an envelope defining an evacuated cavity;

a tunneling device in said evacuated cavity and including a first conductive layer, a first insulating layer which overlies said first conductive layer, a second conductive layer which overlies said first insulating layer, a second isulating layer which overlies said second conductive layer and a third conductive layer which overlies said second insulating layer;

means for biasing said second conductive layer at a positive potential relative to said first conductive layer during operation;

means for applying a control voltage to said third conductive layer;

means for injecting electrons from said first conductive layer through said first insulating layer into said second conductive layer, said electrons in said second conductive layer having a probability that is controlled by said control voltage of tunneling through said second insulating layer and passing through said third conductive layer into said evacuated cavity; and electrode means in said evacuated cavity for receiving the electrons passing into said evacuated cavity, an output signal being taken from one or both of said electrode means and said second conductive layer.

32. A high speed electronic device as defined in claim 31 wherein said third conductive layer has a surface with reduced work function relative to said second conductive layer to prevent collection of electrons by said third conductive layer.

33. A high speed electronic device as defined in claim 31 including means for biasing said first and second conductive layers during readout to prevent collection of electrons by said third conductive layer.

34. A high speed electronic device comprising:

an envelope defining an evacuated cavity;

a tunneling device in said evacuated cavity and including a first conductive layer, a first insulating layer which overlies said first conductive layer, a second conductive layer which overlies said first insulating layer, a second insulating layer which overlies said second conductive layer and a third conductive layer which overlies said second insulating layer;

means for biasing said second conductive layer at a positive potential relative to said first conductive layer during operation;

means for applying a control voltage to said third conductive layer;

said tunneling device being constructed so that a predetermined current of thermal electrons tunnels from said first conductive layer through said first insulating layer to said second conductive layer, said electrons in said second conductive layer having a probability that is controlled by said control voltage of tunneling through said second insulating layer and passing through said third conductive layer into said evacuated cavity; and electrode means in said evacuated cavity for receiving the electrons passing into said evacuated cavity, an output signal being taken from one or both of said electrode means and said second conductive layer.

35. A high speed electronic device as defined in claim 34 wherein said third conductive layer has a surface with reduced work function relative to said second conductive layer to prevent collection of electrons by said third conductive layer.

36. A high speed electronic device as defined in claim 34 including means for biasing said first and second conductive layers during readout to prevent collection of electrons by said third conductive layer.

37. A camera tube comprising:

a photocathode layer capable of emitting electrons having a spatial variation representative of an incident light intensity pattern when exposed to light in a predetermined wavelength range;

an array of cells each emitting secondary electrons and thereby accumulating a charge in response to electrons emitted from a portion of the photocathode layer opposite that cell during exposure;

means for mounting said photocathode layer and said array of cells in closely-spaced, substantially parallel alignment;

means for providing an evacuated cavity between said photocathode layer and said array of cells;

means for causing the electrons emitted by said photocathode layer to impinge on said array of cells so as to form a charge pattern representative of said light intensity pattern; and means for sensing the charge on each of the cells in said array during a readout phase after exposure to provide an electronic representation of said light intensity pattern.

* * * * *